United States Patent [19]

Flexman, Jr.

[11] Patent Number: 4,804,716

[45] Date of Patent: Feb. 14, 1989

[54] TOUGHENED POLYOXYMETHYLENE COMPOSITIONS

[75] Inventor: Edmund A. Flexman, Jr., Wilmington, Del.

[73] Assignee: E. I. Du Pont de Nemours and Company, Wilmington, Del.

[21] Appl. No.: 76,981

[22] Filed: Jul. 21, 1987

Related U.S. Application Data

[63] Continuation of Ser. No. 813,979, Dec. 27, 1985, abandoned, which is a continuation of Ser. No. 570,037, Jan. 16, 1984, abandoned, which is a continuation-in-part of Ser. No. 464,411, Feb. 7, 1983, abandoned.

[51] Int. Cl.[4] .............................................. C08L 59/00

[52] U.S. Cl. .................................... 525/399; 428/36.4

[58] Field of Search ........................................ 525/399

[56] References Cited

U.S. PATENT DOCUMENTS

| | | | |
|---|---|---|---|
| 2,993,025 | 7/1961 | Alsup et al. | 260/42 |
| 3,027,352 | 3/1962 | Walling et al. | 260/67 |
| 3,476,832 | 11/1969 | Pritchard | 260/887 |
| 3,642,940 | 2/1972 | Burg et al. | 260/837 |
| 3,718,711 | 2/1973 | Crano et al. | 260/823 |
| 3,743,614 | 7/1973 | Wolters et al. | 260/18 R |
| 3,749,755 | 7/1973 | Bronstert et al. | 260/876 R |
| 3,787,353 | 1/1974 | Ishii et al. | 260/45.9 P |
| 3,795,715 | 3/1974 | Cherdron et al. | 260/823 |
| 3,850,873 | 11/1974 | Wurmb et al. | 260/37 AL |
| 3,960,984 | 6/1976 | Kohan | 260/857 F |
| 3,975,459 | 8/1976 | Schmidt et al. | 260/876 B |
| 4,017,558 | 4/1977 | Schmidt et al. | 260/876 B |
| 4,098,843 | 7/1978 | Johnson | 260/857 F |
| 4,277,577 | 7/1981 | Burg et al. | 525/154 |

FOREIGN PATENT DOCUMENTS

| | | | |
|---|---|---|---|
| 48-15954 | 2/1973 | Japan . | |
| 52-019752 | 2/1977 | Japan . | |
| 1017244 | 1/1966 | United Kingdom | 525/399 |
| 1381106 | 1/1975 | United Kingdom . | |
| 2071011 | 9/1981 | United Kingdom . | |

*Primary Examiner*—Lewis T. Jacobs
*Assistant Examiner*—A. Carrillo

[57] ABSTRACT

Polyoxymethylene compositions having 15–40 wt. % thermoplastic polyurethane, where the polyurethane has a glass transition of lower than −15° C., the polyoxymethylene has a molecular weight of 20,000–100,000, and the polyurethane is dispersed in the polyoxymethylene as small particles show extraordinary toughness as measured by notched Izod.

51 Claims, No Drawings

TOUGHENED POLYOXYMETHYLENE COMPOSITIONS

CROSS REFERENCE TO RELATED APPLICATION

This application is a continuation of U.S. application Ser. No. 813,979, filed Dec. 27, 1985, now abandoned, which is a continuation of U.S. application Ser. No. 570,037, filed Jan. 16, 1984, now abandoned, which is a continuation-in-part of U.S. application Ser. No. 464,411, filed Feb. 7, 1983, now abandoned.

TECHNICAL FIELD

This invention relates to certain polyoxymethylene compositions which are characterized by extraordinary toughness. Polyoxymethylene compositions are generally understood to include compositions based on homopolymers of formaldehyde or of cyclic oligomers of formaldehyde, for example trioxane, the terminal groups of which are end-capped by esterification or etherification, as well as copolymers of formaldehyde or of cyclic oligomers of formaldehyde, with oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyoxymethylene of relatively high molecular weight, i.e. 20,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished products made from such compositions possess extremely desirable physical properties, including high stiffness, strength and solvent resistance. However, in certain applications, it would be desirable to have greater toughness than has heretofore been possible with conventional polyoxymethylene compositions.

BACKGROUND ART

U.S. Pat. No. 2,993,025, granted July 18, 1961 to Alsup et al; U.S. Pat. No. 3,027,352, granted Mar. 27, 1962 to Walling et al; U.S. Pat. No. 3,743,614, granted July 3, 1973 to Wolters et al; U.S. Pat. No. 3,787,353, granted Jan. 22, 1974 to Ishii et al; U.S. Pat. No. 3,960,984, granted June 1, 1976 to Kohan; and U.S. Pat. No. 4,098,843, granted July 4, 1978 to Johnson, all disclose various polyoxymethylene compositions, both those based on homopolymers and those based on copolymers, and various techniques for stabilizing such compositions. Alsup discloses stabilization of polyoxymethylene compositions by blending therewith a synthetic polyamide. Walling discloses that the thermal stability of certain polyoxymethylene copolymer compositions is improved as compared with corresponding homopolymer. Wolters discloses stabilization of polyoxymethylene compositions by blending therewith a combination of an alkaline earth metal compound and an ester of an (alkyl-hydroxyphenyl)-carboxylic acid with a polyol. Ishii discloses stabilization of polyoxymethylene compositions by blending therewith a compound of the formula $R(NHCOCH_2X)_n$ where R is a hydrocarbon group, X is a cyano or carbamoyl group, and n is 2-6. Kohan discloses stabilization of polyoxymethylene compositions by blending therewith an amide oligomer. Johnson discloses stabilization of polyoxymethylene compositions by blending therewith a dispersion of polyamide in a carrier resin.

The polyoxymethylene compositions described in the patents cited above are examples of compositions that can be modified according to the present invention to give compositions characterized by extraordinary toughness.

Various additives have been used with polyoxymethylene compositions to improve the toughness or impact strength of such compositions. None have been able to achieve the extraordinary degree of toughness reached in the present invention. In addition, the compositions of the present invention achieve the extraordinary degree of toughness with a minimal sacrifice of other desirable properties of such compositions.

U.S. Pat. No. 3,795,715, granted Mar. 5, 1974 to Cherdon et al, discloses improving the impact strength of polyoxymethylene compositions by blending therewith 0.1–10 parts by weight of a polymer having (a) an average molecular weight of 1,000–1,000,000, (b) a softening temperature below the crystalline melting point of the polyoxymethylene, and (c) a second order transition temperature of −120° to +30° C., this latter polymer being present in the form of particles of 0.1–5 microns in diameter. Such copolymers include polyethylene, ethylene/propylene copolymers, (meth)acrylic acid ester homo- or copolymers, diene homo- or copolymers, and vinyl ester homo- or copolymers. Modest improvements in impact strength as measured by a falling weight test are disclosed.

U.S. Pat. No. 4,277,577, granted July 7, 1981 to Burg et al, discloses polyoxymethylene compositions similar to those disclosed by Cherdon, above, except that they also contain 0.01–20 weight percent of a third polymeric component which can be a segmented thermoplastic copolyester or a polyurethane.

U.S. Pat. No. 3,850,873, granted Nov. 26, 1974 to Wurmb et al, discloses improving the physical properties (including impact strength) of glass fiber reinforced polyoxymethylene compositions by blending therewith 0.5–10 weight percent of a high molecular weight thermoplastic polyurethane. The polyurethane is not defined, except by two examples. Modest improvements in impact strength are disclosed.

British Pat. No. 1,381,106, published Jan. 22, 1975, discloses improving the impact strength of polyoxymethylene copolymers by copolymerizing an elastomeric terpolymer having a molecular weight of at least 100,000 therewith via urethane, ureide, thiourethane or thioureide linkages.

U.S. Pat. No. 3,476,832, granted Nov. 4, 1969 to Pritchard, discloses improving the impact resistance of thermoplastic oxymethylene polymers by blending therewith up to 20% of a rubbery polymeric material having a glass transition temperature below 0° C. Preferably, the rubbery material is dispersed as particles having an average diameter of less than 20 microns. Thermoplastic polyurethanes are not mentioned, and only modest increases in impact strength are reported.

U.S. Pat. No. 3,642,940, granted Feb. 15, 1972 to Burg et al, discloses improving the impact strength of polyoxymethylene molding compositions by blending therewith a two phase mixture of an elastomeric and a hard polymer. Thermoplastic polyurethanes are not mentioned as possible elastomeric components of the two phase mixture.

U.S. Pat. No. 3,749,755, granted July 31, 1973 to Bronstert et al, discloses improving the impact resistance of thermoplastic polyoxymethylene molding compositions by blending therewith an elastomeric graft copolymer having a glass transition temperature below −20° C. Thermoplastic polyurethanes are not mentioned.

Other examples of various additives, other than thermoplastic polyurethanes, for improving the impact resistance of polyoxymethylene compositions are disclosed in U.S. Pat. No. 3,975,459, granted Aug. 17, 1976 and U.S. Pat. No. 4,017,558, granted Apr. 12, 1977, both to Schmidt et al; Japanese Patent Publication 48-15,954, published Feb. 28, 1973; and Japanese Patent Publication 52-019,752, published Feb. 15, 1977.

None of the reference discussed or listed above report the extraordinary toughness which can be achieved by the techniques of the present invention.

DISCLOSURE OF THE INVENTION

This invention relates to certain polyoxymethylene compositions which are characterized by extraordinary toughness. The term "polyoxymethylene" as used herein includes homopolymers of formaldehyde or of cyclic oligomers of formaldehyde, the terminal groups of which are end-capped by esterification or etherification, and copolymers of formaldehyde or of cyclic oligomers of formaldehyde with oxyalkylene groups with at least two adjacent carbon atoms in the main chain, the terminal groups of which copolymers can be hydroxyl terminated or can be end-capped by esterification or etherification.

It has been found that certain polyoxymethylenes can be formulated into compositions with extraordinary toughness far in excess of any degree of toughness that has been previously achieved with such polyoxymethylenes. More specifically, when certain polyoxymethylenes having high molecular weights are melt compounded with certain thermoplastic polyurethane elastomers having low glass transition temperatures, such that the proportion of thermoplastic elastomer is greater than 15% by weight and not more than 40% by weight, and further such that the thermoplastic polyurethane elastomer is intimately mixed with and dispersed as a separate phase throughout the polyoxymethylene, said separate phase having a small average cross-sectional size in the minimum direction, as will be defined below, the resulting compositions are characterized by extraordinary toughness as measured in a standard Izod test (ASTM D-256, Method A). The polyoxymethylene compositions of the present invention will be characterized by an Izod toughness value of greater than 375 J/m (7.0 ft-lb/in), preferably greater than 500 J/m (9.4 ft-lb/in), and in the most preferred cases greater than 650 J/m (12.2 ft-lb/in). This can be contrasted with unmodified polyoxymethylene, which will show an Izod value of about 123 J/m or lower. In fact, several of the compositions of the present invention are characterized by a toughness so high, that it is beyond the range measured in the standard Izod test, which means an Izod value of greater than about 1350 J/m (25.3 ft-lb/in). In addition, the preferred compositions of the present invention demonstrate extraordinary toughness by showing ductile failure in a variety of tests (including the standard Izod test) as well as having high Izod values.

It has been found that polyoxymethylene compositions with exceptionally high toughness, i.e. an Izod value greater than 375 J/m (7.0 ft-lb/in), can be made only when several important parameters or conditions coexist.

In particular, extraordinary toughness in polyoxymethylene compositions require that the polyoxymethylene polymer be of a certain molecular weight. More specifically, the polyoxymethylene polymer can be branched or linear and must have a number average molecular weight in the range of 20,000 to 100,000, preferably 25,000 to 90,000, more preferably 30,000 to 70,000, and most preferably 60,000–70,000. The molecular weight of the polyoxymethylene can be conveniently measured by gel permeation chromatography in m-cresol at 160° C. using a Du Pont PSM bimodal column kit with nominal pore size of 60 and 1000 Å. If the molecular weight of the polyoxymethylene polymer is too high, then processing limitations come into play, and it will be difficult to blend the polyoxymethylene with the thermoplastic polyurethane in a short enough time and at a low enough temperature to prevent significant degradation of either. This is because blending of the polyoxymethylene with the thermoplastic polyurethane is normally done at a temperature which is relatively close to the temperature at which the thermoplastic polyurethane will degrade, given enough time at that temperature. If the molecular weight of the polyoxymethylene is too high, the amount of mechanical energy put in during compounding to achieve intimate mixing of the blend components will be so great that it will be difficult to maintain the temperature of the blend below the degradation temperature of the polyurethane, even with external cooling on the mixing apparatus. If the molecular weight of the polyoxymethylene is too low, the melt viscosity of the polyoxymethylene will be low, and it will be difficult to achieve sufficient intimate mixing at appropriate shear levels with the polyurethane such that the polyurethane will be dispersed throughout the polyoxymethylene as a second phase having a small average cross-sectional size in the minimum direction, as will be defined below. The importance of the average cross-sectional size of the polyurethane phase will be discussed below. Within the limitations as described above, however, and assuming all other parameters are equal, generally the higher the molecular weight of the polyoxymethylene, the higher the toughness of the compositions of the present invention.

As an alternative to characterizing the polyoxymethylene by its number average molecular weight, it can be characterized by its melt flow rate. Polyoxymethylenes which are suitable for use in the compositions of the present invention will have a melt flow rate (measured according to ASTM D-1238, Procedure A, Condition G with a 1.0 mm (0.0413 inch) diameter orifice) of 0.1–30 grams/10 minutes. Preferably, the melt flow rate of the polyoxymethylene used in the compositions of the present invention will be from 0.5–10 grams/10 minutes. The most preferred polyoxymethylenes are linear polyoxymethylenes with a melt flow rate of about 1 gram/10 minutes or branched polyoxymethylenes with a melt flow rate of less than 1 gram/10 minutes.

As indicated above, the polyoxymethylene can be either a homopolymer, a copolymer or a mixture thereof. Copolymers can contain one or more comonomers, such as those generally used in preparing polyoxymethylene compositions. Comonomers more commonly used include alkylene oxides of 2–12 carbon atoms. If copolymer is selected, the quantity of comonomer will be not more than 20 weight percent, preferably not more than 15 weight percent, and most preferably about 2 weight percent. The most preferred comonomer is ethylene oxide, and preferred polyoxymethylene copolymers are dipolymers of formaldehyde and ethylene oxide where the quantity of ethylene oxide is about 2 weight percent. Generally, polyoxymethylene homopolymer is preferred over copolymer because of its greater stiffness. The most preferred homopolymers for use in the compositions of the present invention are those with a molecular weight of about 65,000 and those whose terminal hydroxyl groups have been end-capped by a chemical reaction to form ester or ether groups, preferably acetate or methoxy groups, respectively.

The proportion of the polyoxymethylene in the compositions of the present invention should be at least 60% by weight and less than 85% by weight of the composition. Accordingly, the thermoplastic polyurethane will comprise more than 15% by weight and not more than 40% by weight of the composition. It should be understood that the compositions of the present invention include compositions containing only polyoxymethylene and polyurethane in the above-stated proportions and also compositions containing other ingredients, modifiers and/or additives including polyamide stabilizers, such as those disclosed in U.S. Pat. Nos. 3,960,984 and 4,098,843, anti-oxidants, pigments, colorants, carbon black, reinforcing agents and fillers, provided that the above-stated relative proportions of the polyoxymethylene and the thermoplastic polyurethane are maintained. Within the limits described above, and assuming all other parameters are equal, the greater the proportion of the thermoplastic polyurethane, the higher the toughness of the compositions of the present invention. However, at extremely high levels of polyurethane, there is a deterioration of some properties of the polyoxymethylene compositions, such as stiffness and strength, because the thermoplastic polyurethane phase will tend to become continuous. Accordingly, to achieve an optimum balance between the extraordinary toughness of the compositions of the present invention and the other highly desirable properties ordinarily present in polyoxymethylene compositions, compositions containing greater than 15 weight percent up to 40 weight percent of polyurethane are generally needed, preferably 20–40 weight percent polyurethane, more preferably 20–35 weight percent polyurethane, especially 25 to 35 weight percent polyurethane and most preferably 25 to 32 weight percent polyurethane.

Another important parameter necessary to the preparation of polyoxymethylene compositions characterized by exceptional toughness is the average cross-sectional size of the dispersed thermoplastic polyurethane phase in the minimum direction. The polyoxymethylene polymer will comprise the continuous phase of the compositions of the present invention and the thermoplastic polyurethane will be dispersed throughout the continuous phase polyoxymethylene. The thermoplastic polyurethane can comprise discrete particles dispersed throughout the polyoxymethylene continuous phase, and this configuration is most commonly found when the proportion of polyurethane in the composition is relatively low. These particles of polyurethane can be approximately spherical in shape (i.e. the particles will have an aspect ratio approximately equal to 1.0) or elongated (i.e. the particles will have an aspect ratio substantially greater than 1.0), and their size distribution can be Gaussian, bi- or polymodal, or other. If elongated, they can be only slightly elongated and approximately oval in shape, or they can be greatly elongated and resemble strands of thermoplastic polyurethane running through the polyoxymethylene continuous phase. In fact it is possible for such strands to run continuously the full length of an article made from the compositions of the present invention. Alternatively, such strands can be interconnected so as to form a network of thermoplastic polyurethane particles throughout the polyoxymethylene continuous phase, and this configuration is most commonly found when the proportion of polyurethane in the composition is relatively high. It is believed that such networks constitute the preferred configuration for the high toughness compositions of the present invention. Also, because of orientation caused by the injection molding equipment, the shape of the polyurethane phase may be different near the surface of the injection molded article than near the center of the article.

It has been observed that when the polyurethane phase is elongated, the direction of elongation is generally the same for all of the phase and is generally in the direction of the shear applied during the final stage of the preparation of the composition while still in its molten state. For example, in the preparation of the compositions of the present invention in a rod shape by melt compounding in a twin-screw extruder, followed by passage through a round die and quenching in water, the elongation, if any, of the thermoplastic polyurethane will generally run parallel to the axis of the rod. It has been found most useful for the purpose of characterizing the compositions of the present invention to measure average cross-sectional size of the polyurethane phase in a plane perpendicular to the direction of elongation and in the center of the formed article.

Average cross-sectional size was measured by the following technique. A "Sorvall" MT-2B ultramicrotome equipped with a diamond knife and a "Sorvall-Christensen" FTS-LTC-2 sectioner, operating at −90° C., was used to cut sections 200 nanometers thick from the center area of a molded 0.32×1.27×12.7 cm (⅛ in×½ in×5 in) bar perpendicular to the bar axis. Because of the anisotropic nature of bars injection molded from the compositions of the present invention, it has been found that the most convenient, consistent and accurate characterization of average cross-sectional size of the thermoplastic polyurethane phase is obtained when measuring perpendicular to the flow direction and in the middle of the 0.32 cm (⅛ inch) bars. Ethanol was used as a knife lubricant and a number of slices were collected and then placed a petri dish containing distilled water. The mixing action of the ethanol and water spread the microtomed slices apart and allowed them to float on the top of the water. The microtomed slices were placed on a 200 mesh copper microscope grid. Electron photomicrographs of typical areas were photographed at 2500× using a Zeiss EM10A electron microscope at 80 KV equipped with a 70 mm roll film camera and Eastman 5302 film. Darkroom enlargements of the microscope negatives resulted in final 20.3×25.4 cm (8 in×10 in) photomicrographs at 11,800×.

Two 10.2×12.7 cm (4 in×5 in) pieces were cut from each 20.3×25.4 cm (8 in×10 in) photomicrograph with the 12.7 cm (5 in) edge of each piece parallel to the direction, if any, in which most of the polyurethane was oriented. Most photomicrographs had such a direction. Each photomicrograph was scanned across the short dimension one row at a time by a flying spot scanner 200 microns square. This photomicrograph line of spots appeared as a pattern of light and dark areas with varying levels of grey between them. The average density of this line was calculated. All images darker (more dense) than this average value were considered to be the thermoplastic polyurethane phase. Conversely all images lighter than this line were considered to be the polyoxymethylene matrix. The mean length of the up pulses (dark areas or thermoplastic polyurethane phase) was calculated. This measure is referred to hereinafter as the "average cross-sectional size of the polyurethane phase in the minimum direction", or simply the "average cross-sectional size".

The data were gathered and recorded using a Model 0-1000 scanner manufactured by Optronics International Inc.

It has been determined that average cross-sectional size of the dispersed thermoplastic polyurethane phase in the minimum direction exerts a strong influence on the toughness of the compositions of the present invention, i.e., assuming all other parameters are equal, the smaller the average cross-sectional size of the polyurethane, the higher the toughness, provided that the polyurethane exists as a discrete phase dispersed throughout the polyoxymethylene rather than dissolved in the polyoxymethylene and provided further that the polyurethane phase has an average cross-sectional size that is not so small as to not be capable of finite measurement by the above-described technique at 10,000× magnification. For example, one particular thermoplastic polyurethane (an ethylene adipate based material containing no "hard" segments, i.e. containing no chain extender and only one diisocyanate group linking the ethylene adipate segments, having "soft" segments of M.W.≈2000 and having a $T_g \approx -20°$ C.) has been found to give such a composition where the average cross-sectional size of the polyurethane phase is actually too small to be measured by the above-described technique (the polyurethane appears as cloudy areas in the 10,000× magnification photomicrograph, rather than as a discrete phase) and, in turn, the polyurethane phase is too small to be effective in toughening the polyoxymethylene. Accordingly, as a practical matter, the polyurethane phase in the compositions of the present invention should have an average cross-sectional size in the minimum direction of at least 0.01 microns. And with this minimum, compositions of the present invention having extraordinary toughness can be made when the average cross-sectional size of the thermoplastic polyurethane pase is not greater than 0.9 microns. Preferably the average cross-sectional size of the thermoplastic polyurethane phase will be less than 0.7 microns, most preferably less than 0.5 microns. Smaller sizes give extraordinary toughness at lower concentrations of thermoplastic polyurethane. Generally, the optimum average cross-sectional size of the thermoplastic polyurethane phase will be about 0.5 microns or lower in compositions having about 30 weight percent thermoplastic polyurethane.

Another important parameter necessary to the preparation of polyoxymethylene compositions characterized by exceptional toughness is the selection of particular thermoplastic polyurethanes. Thermoplastic polyurethanes suited for use in the compositions of the present invention can be selected from those commercially available or can be made by processes known in the art. (See, for example, Rubber Technology, 2nd edition, edited by Maurice Morton (1973), Chapter 17, Urethane Elastomers, D. A. Meyer, especially pp. 453-6). Polyurethanes are derived from the reaction of polyester or polyether diols with diisocyanates and optionally also from the further reaction of such components with chain-extending agents such as low molecular weight polyols, preferably diols, or with diamines to form urea linkages. Polyurethane elastomers are generally composed of soft segments, for example polyether or polyester polyols, and hard segments, usually derived from the reaction of the low molecular weight diols and diisocyanates. Polyurethane elastomer with no hard segments can be used to prepare compositions of the present invention. As with all other thermoplastic polyurethanes useful in the compositions of the present invention, one still needs to achieve the proper combination of glass transition temperature and average cross-sectional size of the polyurethane phase. As noted above, at least one "all soft" ethylene adipate based polyurethane has been found to give product, with normal shear during extrusion, where the average cross-sectional size of the polyurethane phase is actually too small for the polyurethane to function effectively as a toughening agent. In any event, the polyurethanes most useful in the compositions of the present invention will contain both soft and hard segments.

In the preparation of the thermoplastic polyurethanes useful in the compositions of the present invention, a polymeric soft segment material having at least two hydroxyl groups per molecule and having a molecular weight of at least about 500 and preferably from about 550 to about 5,000 and most preferably from about 1,000 to about 2,500, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08, more preferably 0.95 to 1.05, and most preferably, 0.95 to 1.00. In addition, monofunctional isocyanates or alcohols can be used to control molecular weight of the polyurethane.

Suitable polyester polyols include the polyesterification products of one or more dihydric alcohols with one or more dicarboxylic acids. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof, including small amounts of aromatic dicarboxylic acids. Suitable dihydric alcohols include ethylene glycol, 1,3- or 1,2-propylene glycol, 1,4-butanediol, 1,3-butanediol, 2-methyl pentane diol-1,5, diethylene glycol, 1,5-pentanediol, 1,5-hexanediol, 1,2-dodecanediol, and mixtures thereof.

Further, hydroxycarboxylic acids, lactones, and cyclic carbonates, such as ϵ-caprolactone and 3-hydroxybutyric acid can be used in the preparation of the polyester.

Preferred polyesters include poly(ethylene adipate), poly(1,4-butylene adipate), mixtures of these adipates, and poly ϵ-caprolactone.

Suitable polyether polyols include the condensation products of one or more alkylene oxides with a small amount of one or more compounds having active hydrogen containing groups, such as water, ethylene glycol, 1,2- or 1,3-propylene glycol, 1,4-butanediol and 1,5-pentanediol, and mixtures thereof. Suitable alkylene oxide condensates include those of ethylene oxide, propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide, 1,2-propylene oxide and/or tetrahydrofuran (THF). Alternatively, a THF polyether copolymer with minor amounts of 3-methyl THF can also be used.

Preferred polyethers include poly(tetramethylene ether) glycol (PTMEG), poly(propylene oxide) glycol, and copolymers of propylene oxide and ethylene oxide, and copolymers of tetrahydrofuran and ethylene oxide. Other suitable polymeric diols include those which are primarily hydrocarbon in nature, e.g. polybutadiene diol.

Suitable organic diisocyanates include 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, isomeric mixtures of 2,4- and 2,6-tolylene diisocyanate, 4,4'-methylene bis(phenylisocyanate), 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, 4,4'-diphenyl diisocyanate, azobenzene-4,4'-diisocyanate, m- or p-tetramethylxylene diisocyanate and 1-chlorobenzene-2,4-diisocyanate. 4,4'-Methylene bis(phenylisocyanate), 1,6-hexamethylene diisocyanate, 4,4'-dicyclohexylmethane diisocyanate and 2,4-tolylene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isopropyl-a-glyceryl ether, 1,3-propanediol, 1,3-butanediol, 2,2-dimethyl-1,3-propanediol, 2,2-diethyl-1,3-propanediol, 2-ethyl-2-butyl-1,3-propanediol, 2-methyl-2,4-pentanediol, 2,2,4-trimethyl-1,3-pentanediol, 2-ethyl-1,3-hexanediol, 1,4-butanediol, 2,5-hexanediol, 1,5-pentanediol, dihydroxycyclopentane, 1,6-hexanediol, 1,4-cyclohexanediol, 4,4'-cyclohexanedimethylol, thiodiglycol, diethylene glycol, dipropylene glycol, 2-methyl-1,3-propanediol, 2-methyl-2-ethyl-1,3-propanediol, dihydroxyethyl ether of hydroquinone, hydrogenated bisphenol A, dihydroxyethyl terephthalate and dihydroxymethyl benzene and mixtures thereof. Hydroxyl terminated oligomers of 1,4-butanediol terephthalate can also be used, giving a polyester-urethane-polyester' repeating structure. Diamines can also be used as chain extending agents giving urea linkages. 1,4-Butanediol, 1,2-ethanediol and 1,6-hexanediol are preferred.

In the preparation of the thermoplastic polyurethanes the ratio of isocyanate to hydroxyl should be close to unity, and the reaction can be a one step or a two step reaction. Catalyst can be used, and the reaction can be run neat or in a solvent.

Apart from what is described above concerning selection of the polyurethane, the most important characteristic of the thermoplastic polyurethane is its soft segment glass transition temperature (Tg). Wherever a glass transition temperature is reported herein, it is as determined using a Du Pont Model 981 Dynamic Mechanical Analysis Cell attached to a Model 990 DTA instrument. The cell was modified to use liquid nitrogen as the coolant and to allow the use of a 3.2 cm (1.25 inch) gap holding the specimen. The oscillation amplitude was set at 0.2 mm. A heating rate of 2.5° C./min was used from −170° C. to 0° to 40° C. depending on the signal amplitude. Readings were taken every 1° C. increment. The storage and loss moduli were plotted and the major loss modulus peak was defined as the soft segment glass transition temperature. It has been found that, all other parameters being equal, the lower the glass transition temperature of the soft segment of the thermoplastic polyurethane, the higher the toughness. Compositions of the present invention having extraordinary toughness can best be made when the soft segment glass transition temperature of the thermoplastic polyurethane is less than −15° C. Preferably, the soft segment glass transition temperature of the polyurethane should be less than −20° C. and most preferably below −30° C. Combinations or mixtures of thermoplastic polyurethanes can also be used in the compositions of the present invention, and, as described in greater detail below, certain combinations can prove to be more effective than equivalent amounts of any of the components of the combination used separately.

These parameters discussed above have been found to be the most important in determining whether one can prepare a polyoxymethylene/thermoplastic polyurethane composition having extraordinary toughness. Clearly, the optimum composition, i.e. the composition having the highest toughness while maintaining an adequate level of other properties important in polyoxymethylene compositions and fabricated articles, will result when one chooses materials and conditions representing the optimum value for each of these most important parameters. For example, to achieve the optimum composition, one should choose a polyoxymethylene homopolymer of high molecular weight (e.g. about 63,000) and a thermoplastic polyurethane of low glass transition temperature (e.g. about −35° C.), and one should blend about 70% by weight of the polyoxymethylene with about 30% by weight of the thermoplastic polyurethane in such a way as to intimately mix these two components and to disperse the thermoplastic polyurethane as a separate phase in the polyoxymethylene, said polyurethane phase having an average cross-sectional size in the minimum direction less than 0.5 microns. Equally clearly, one can prepare compositions of the present invention having extraordinary toughness, albeit perhaps not as high as the optimum composition, by deviating from the optimum on one or more of most important parameters discussed above. These parameters, however, are interdependent, each with each other, and the effect of deviating from the optimum on each of these parameters may be cumulative. Thus if one chooses to operate at the fringe with respect to several or all of these parameters, it is possible to prepare polyoxymethylene/thermoplastic polyurethane compositions that will be useful, but whose toughness will be less than extraordinary. Thus it becomes important to define what is considered extraordinary toughness.

For the purpose of defining the present invention, toughness is measured according to ASTM D-256, Method A. Samples were notched using a single toothed cutting wheel on a TMI Notching Cutter Model 43-15 with a cutter speed setting of 10.0 and a feed speed setting of 6.0. The samples were allowed to stand at room temperature three days after molding prior to testing. Since the relative humidity does not effect toughness of the sample significantly, no effort was made to control the specimens moisture content. Specimens were prepared from a 12.7 cm×1.27 cm×0.32 cm (5 in×½ in×⅛ in) injection molded bar cut in half with a notch in each half cut approximately 3.1 cm (1¼ in) from each end. Six samples of each composition were tested at room temperature and the average value was reported.

As mentioned above, the polyoxymethylene thermoplastic polyurethane compositions of the present invention are considered to have extraordinary toughness when they are characterized by an Izod value of greater than 375 J/m, preferably greater than 500 J/m, and most preferably greater than 650 J/m. Accordingly, compositions of the present invention will consist essentially of (a) greater than 15% by weight and not more than 40% by weight of at least one thermoplastic polyurethane, which polyurethane has a glass transition temperature of lower than −15° C., and (b) at least 60% by weight and less than 85% by weight of at least one polyoxymethylene polymer, which polyoxymethylene polymer has a number average molecular weight of from 20,000 to 100,000, the above-stated percentages being based on the total amount of components (a) and (b) only, the thermoplastic polyurethane being dispersed throughout the polyoxymethylene as a separate phase having an average cross-sectional size in the minimum dimension of not greater than 0.9 microns, and the composition having an Izod value of greater than 375 J/m. As noted above, various other ingredients, modifiers and/or additives can be included in the compositions of the present invention, provided that the above-stated relative proportions of the polyoxymethylene and the polyurethane are maintained.

While the parameters discussed above are the most important in determining whether a particular polyoxymethylene/thermoplastic polyurethane composition will be characterized by extraordinary toughness, other parameters can influence to a lesser degree the toughness of a particular composition. For example, compatibility of the thermoplastic polyurethane with the polyoxymethylene will influence the properties of the composition. Compatibility of the respective components of the composition can be evaluated by various techniques, however one especially reliable indicator is critical surface tension. Critical surface tension can be measured by graphical treatment of contact angle data from the use of purified liquids on molded plaques of the polymeric material to be treated. The advancing angle of each liquid on the plaque is obtained by measuring the contact angles of 3-droplet increments, resulting in 6 angles measured for each liquid. Any datum point that is seriously outside the average range is rejected from further calculations.

The raw data are used as input to prepare a plot of the cosine of the average contact angle for each liquid (the data range is shown also) versus the liquid/vapor surface tension for that liquid. A line is drawn from a least-squares fit of the data; the point at which this line passes through the surface tension axis (where the cosine equals one) is called the "critical surface tension". (See, e.g., W. A. Zisman, "Relation of Equilibrium Contact Angle to Liquid and Solid Constitution;" F. M. Fowkes, ed., *Contact Angle, Wettability, and Adhesion,* Adv. Chem. Series 43, 1, 1964; and J. J. Bikerman, *Physical Surfaces,* Academic Press, N.Y. 1970)

All other parameters being equal, the lower the difference in critical surface tension of the components of the composition, the more compatible they are and the smaller will be the average cross-sectional size of the polyurethane phase. As noted above, however, if the polyurethane is too compatible with the polyoxymethylene, it will not be effective in toughening the polyoxymethylene.

Similarly, the melt viscosity of the thermoplastic polyurethane at the compounding temperature will influence the properties of the composition. If the melt viscosity is too low, it will be difficult to disperse the polyurethane into a separate phase having a small average cross-sectional size. If the melt viscosity is too high, the thermoplastic polyurethane becomes difficult to process at a temperature below its decomposition temperature. It is believed that an important aspect with respect to the melt viscosity of the polyurethane is how closely it approximates the melt viscosity of the polyoxymethylene at the processing temperature.

As a practical matter, melt viscosity of the polyurethane at the compounding temperature cannot be accurately measured because the preferred compounding temperatures are extremely close to the degradation temperatures of the polyurethanes. Thus, inherent viscosity of the polyurethane is used instead. Melt viscosity is related to inherent viscosity, although not necessarily in direct proportion. For the purpose of the present invention, one should generally use a thermoplastic polyurethane with an inherent viscosity of 0.7 or above (as measured by ASTM D-2857 with a "Schott" automatic viscometer at 0.1% polyurethane in dimethyl formamide at 30° C.). Thermoplastic polyurethanes having inherent viscosities up to 2.7 have been used successfully in the compositions of the present invention, but those having inherent viscosities of 0.75–2.5 are generally preferred, with those having inherent viscosities of 1.0–1.7 being most preferred. It has also been found that the preferred inherent viscosity of the polyurethane will depend on the chemical type of the polyurethane. For example, polyurethanes having polyethylene adipate soft segments should preferably have an inherent viscosity of at least 0.7, polyurethanes having polybutylene adipate soft segments should preferably have an inherent viscosity of at least 0.9, and polyether type polyurethanes should preferably have an inherent viscosity of at least 2.0. It should be understood that inherent viscosity is only a means of evaluating the approximate melt viscosity of the polyurethane, and it is the melt viscosity at the compounding temperature that is really the parameter of concern. Accordingly, it is possible to start with a polyurethane having a very low inherent viscosity, and then modify it during the blending operation, e.g. by further polymerization or crosslinking, thus increasing the effective melt viscosity of the polyurethane to a desirable level, even though the inherent viscosity of the starting material polyurethane was quite low. Alternatively, one could begin with a polyurethane having a higher inherent viscosity and degrade or hydrolyze it during compounding to obtain the desired effective melt viscosity. Alternatively, one could use blends of high and low molecular weight polyurethanes.

Another related parameter than can influence to a lesser degree the toughness of a particular composition is the molecular weight of the soft segment of the thermoplastic polyurethane. If the molecular weight of the soft segment is too low, the glass transition temperature will not be low enough. This is believed to be due to incomplete separation of the soft segments from the hard segments. If the molecular weight of the soft segment is too high, crystallization will result, and the polyurethane glass transition temperature will be too high. Generally, the molecular weight of the soft segment should average between about 550 and about 5000, preferably about 850–3000, more preferably about 1000–2500, with the most preferred polyurethanes having soft segments with an average molecular weight of about 2000. The desired soft segment average molecular weight can be achieved with a narrow molecular weight distribution or with a broad molecular weight distribution. In fact, one can prepare the compositions of the present invention with blends of polyurethanes having very high and very low molecular weight soft segments outside the ranges stated above) such that the average molecular weight of the soft segment is within the ranges stated above, i.e. with polyurethanes having an extremely broad molecular weight distribution for the soft segments.

The moisture content of the composition, in particular of the polyurethane, can influence the results achieved. Water is known to react with polyurethanes, causing the polyurethane to degrade, lowering the effective molecular weight of the polyurethane, lowering the inherent and melt viscosity of the polyurethane, and making it more difficult to create compositions containing a polyurethane phase having a small average cross-sectional size. Accordingly, the drier the better. In any event, the ingredients in the compositions of the present invention and the compositions of the present invention themselves should contain less than 0.2 percent by weight of water, preferably less than 0.1 percent, especially when there is no opportunity for the water to escape, for example during injection molding.

The processing conditions used in the preparation and molding of the compositions of the present invention can also influence the toughness of the compositions. As mentioned above, the polyurethane must be intimately mixed and dispersed in the polyoxymethylene as a separate phase having a small average cross-sectional size, and it must be maintained in that state during the formation of the finished products. Accordingly, when reference is made to the compositions of the present invention, that is meant to include molded articles or shaped products as well as melt compounded material that can be subsequently shaped or molded.

Any intensive mixing device capable of developing high shear at temperatures above the melting points of the ingredients can be used to disperse the polyurethane in the polyoxymethylene. Examples of such devices include rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing such as valves, gates or screws designed for this purpose. To obtain the most preferred compositions of the present invention, i.e. those with the highest notched Izod values, it is important to use a mixing device that will achieve intimate mixing with the greatest efficiency, consistency and evenness. When considered together with the various other parameters discussed above, if one chooses compositional components at less than optimum, e.g. choosing a polyurethane with borderline glass transition temperature, and also chooses an inefficient mixing device, e.g. a rubber mill, it is possible that an unacceptable composition, e.g. one with notched Izod value of less than 375 J/m, will result. Accordingly, continuous devices are preferred; and twin screw extruders, particularly those incorporating high intensity mixing sections such as reverse pitch elements and kneading elements, are especially preferred. The mixing device used in all of the examples of the present application unless noted otherwise as a 28 mm co-rotating Werner and Pfleiderer twin screw extruder, using a screw design containing two working sections with a total of five kneading elements (75 mm total), two reverse elements (24 mm total), and a vacuum port at about 70% of the distance from the feed throat to the die. All zones were set at 190° C. Temperature of the melt coming out of the die was about 220°–260° C. A low flow of cooling water was used to reduce temperatures in some cases. The extruder was operated at 200–250 rpm with 6.8–9.1 kg (15–20 pounds) per hour throughput. A nitrogen blanket was maintained over the feed throat to exclude oxygen and pressure dryness of the ingredients, and the strand exiting the die was quenched in water and cut into pellets. One can deviate from those conditions. For example melt temperatures below 190° C. or higher than 260° C. are possible if throughput is adjusted to compensate and unmelted or decomposed product is not produced. However, 170°–260° C. is considered preferred, with 185°–240° C. more preferred, and 200°–230° C. most preferred for melt compounding. The melt temperatures indicated are estimates based upon measurements taken exit the die. Depending on the extruder configuration, there can be significant cooling between the last point of mixing and the die. Actual melt temperatures may be somewhat higher.

Equally important are the fabricating conditions used in the preparation of shaped articles, for if one prepares the shaped articles of the present invention from previously melt compounded material, it is important to maintain the conditions created in the melt compounded material, such as average cross-sectional size and distribution of the thermoplastic polyurethane phase in the polyoxymethylene, dryness of the composition, inherent and melt viscosity of the polyurethane, etc. Articles can be made by any of several common methods, including compression molding, injection molding, extrusion, blow molding, rotational molding, melt spinning and thermoforming. As mentioned above with respect to mixing devices, to obtain the most preferred shaped articles of the present invention, i.e. those with the most extraordinary toughness, it is important to use a shaping device that will maintain, and preferably improve, the parameters discussed above, e.g. particle size and distribution of the polyurethane in the polyoxymethylene. If one chooses compositional components at less than optimum, and also chooses a less preferred shaping device, e.g. a compression mold, it is possible that an unacceptable shaped article, e.g. one with a notched izod value of less than 375 J/m, will result. Accordingly, injection molding is especially preferred. Examples of shaped articles include sheet, profiles, rod stock, film, filaments, fibers, strapping, tape, tubing and pipe. Such shaped articles can be post treated by orientation, stretching, coating, annealing, painting, laminating and plating. Articles of the present invention can be ground and remolded.

Generally, the conditions used in the preparation of shaped articles will be similar to those described above for melt compounding. More specifically, melt temperatures and residence times can be used up to the points at which significant degradation of the composition occurs. Preferably, the melt temperature will be about 170°-250° C., more preferably about 185°-240° C., and most preferably about 200°-230° C. When injection molding the compositions of the present invention, it is preferable that the mold be as cold as possible consistent with the intricacy of the shape being produced. That is, generally, the colder the mold, the smaller the average cross-sectional size of the polyurethane phase in the shaped article. However, colder molds are harder to fill, particularly where the passages may be narrow or the shape is intricate. Generally, the mold temperature will be 10°-120° C., preferably 10°-100° C., and most preferably the mold temperature will be about 50°-90° C. Generally, total hold-up time in the melt will be about 3-15 minutes, with the shorter times being preferred, consistent with giving a high quality shaped article. If the total hold-up time in the melt is too long, the polyurethane phase can degrade and/or coalesce. As an example, the standard 0.32 cm (⅛ in) thick test specimens used in the Izod tests reported later in this application were prepared in a 1.5 ounce "Arburg" reciprocating screw injection molding machine, model 221-75-350 using cylinder temperature settings of 180° C. rear, 190° C. center, 200° C. front, and 210° C. nozzle, with a mold temperature of 90° C., a back pressure of 0.3 MPa (50 p.s.i.), a screw speed of 120 rpm, a ram speed setting of 5, a cycle of 45 seconds injection/15 seconds hold, and a general purpose screw. Total hold-up time of the melt was estimated to be about five minutes. Samples were allowed to stand for three days between molding and testing.

In the following examples, there are shown specific embodiments of the present invention and certain side-by comparisons with embodiments of control experiments where one or more of the parameters discussed above was chosen outside the range defining the limits of the present invention. It will be seen that the compositions of the present invention are characterized by extraordinary toughness, while the control compositions are not. All parts and percentages are by weight, and all temperatures are in degress Celsius unless otherwise specified. Measurements not originally in SI units have been so converted and rounded where appropriate.

In the following examples Flexural Modulus was determined in accord with ASTM 790, Geometry A, Method A on three specimens and the average value is reported. Samples were allowed to stand three days at room temperature after molding. The chemical composition of each of the commercially available thermoplastic polyurethanes tested was determined using a "Varian Associates" Model XL 200 nuclear magnetic resonance spectrometer. Proton spectra were used. The thermoplastic polyurethane was dissolved in deutero-1,1,2,2-tetrachloroethane at 2-5% solids and was examined at 100°-120° C.

In the following examples, in addition to the thermoplastic polyurethane and the polyoxymethylene, all but two (the control in Table I and Example 118) of the compositions tested contained 1.5 weight percent of a polyamide oligomer stabilizer (as described in U.S. Pat. No. 3,960,984) and 0.1 weight percent of a 4,4'-butylidene bis(6-t-butyl-m-cresol) antioxidant. The control in Table I and Example 118 contained 0.4% of a polyamide stabilizer (terpolymer of approximately 43% polycaprolactam, 33.6% polyhexamethylene adipamide, and 23.4% polyhexamethylene sebacamide) and 0.1% of 2,2'-methylene bis(6-t-butyl-4-methyl phenol). In addition, the copolymers used in Examples 100-106 may have contained additives proprietary to the supplier. Unless stated otherwise, the polyoxymethylene was an acetate end-capped homopolymer (prepared according to U.S. Pat. No. 2,998,409) having a number average molecular weight of about 63,000. The use of stabilizers and antioxidants is not necessary for the operability of the present invention. They were used in the following examples to improve thermal and oxidative stability, and they do not exert a major influence on the toughness of the compositions tested.

EXAMPLE 1

Preparation of Thermoplastic Polyester Polyurethane

Thermoplastic polyurethanes suitable for use in the compositions of the present invention can be selected from among those commercially available or can be made by techniques known in the art. A typical suitable polyester polyurethane was made as follows:

A cylindrical reaction vessel with a hemispherical bottom was used. The vessel was about 95 mm inside diameter and about 160 mm high. It terminated in a 55/50 inner joint. It was used with a top made from a 55/50 outer joint which was fitted with a 10 mm "True-bore" stirring guide for the mechanical stirrer, a 10/30 outer joint for the thermometer (17.8 cm immersion), and an additional 29/26 outer joint to allow additions. The stirrer blade was a glass propeller about 41 mm wide.

383.1 grams of a mixture containing 1972 g of "Rucoflex" S 102 P 55 (dried hydroxy terminated butylene adipate, hydroxyl number=55) and 88.7 g of dried 1,4-butanediol was added to the cylindrical polymerization vessel. 5 drops (about 0.05 g) of "DABCO" 33 LV (33 wt. % triethylene diamine in dipropylene glycol) cyclic amine catalyst was added to this mixture. The catalyst was stirred into the diol mixture until well mixed, and the mixture was maintained at about 55±5° C.

88.9 g of molten MDI [4,4'-methylene bis(-phenylisocyanate)] which had been recently distilled was added to this mixture. The MDI was mixed with the diols by stirring rapidly and moving the reaction pot up and down with respect to the stirrer blade. (The stirrer was stopped from time to time to allow the gas bubble to rise from the cavitated region around the propeller). The temperature of the mixture increased from 53° C. to 78° C. at which point it was poured into a pan (coated with Teflon® fluorocarbon polymer) which had been preheated to 100° C. in a vacuum oven. The oven containing the pan and the polymerizing mixture was evacuated to 0.5 atmosphere pressure and then the pressure was raised with nitrogen to 0.97 atmosphere. This process was repeated 11 more times.

The polymerization was allowed to continue for 66 hours at 100° C. and 0.95 atmosphere of nitrogen. The resultant polymer, hereinafter referred to as polyurethane A, was removed from the vacuum oven and allowed to cool. The inherent viscosity determined for this polymer was 1.47 (0.1% in DMF at 30° C.).

The polymer was then chopped into cubes (6 mm on an edge) for melting compounding with polyoxymethylene, and the resultant composition was injection molded and Izod tested as described above. The Izod value found for a blend of 30 weight percent of this polyurethane with 70 weight percent of polyoxymethylene homopolymer was 1080 J/m.

EXAMPLE 2

Preparation of Thermoplastic Polyether Polyurethane

Poly(tetramethylene ether) glycol of molecular weight 1000 (PTMEG-1000) was dried by heating to 100° C. and then degassing at 2 mm Hg with increasing stirring until the initially rapid evaluation of gases dropped to a slow rate (approx. 5 minutes). The dried PTMEG-1000 was cooled to room temperature and stored under nitrogen at atmospheric pressure.

The dried PTMEG-1000 [1000 g, 1 mole] was mixed with dry 1,4-butanediol [180.2 g, 2 moles]. This mixture was added slowly over a 90 minute period to refluxing phosgene [990 g, 10 moles] in a 5 liter, 4-neck round-bottom flask which was equipped with a stirrer, a dropping funnel, a gas-inlet tube, and a large dry ice/acetone condenser with a lead to a water scrubber. (The lead to the scrubber was fitted with a demand-controller source of nitrogen and a trap to prevent suck-back into the reaction flask.) The resulting solution was stirred for about 6 hours and then allowed to reflux overnight under the dry ice/acetone condenser. The dry ice/acetone was removed from the condenser the next morning and the flask was sparged for 24 hours with nitrogen put through the gas inlet tube to remove the phosgene by way of the scrubber. This procedure gives a mixed bischloroformate.

Recrystallized piperazine (58.5 g, 0.68 mole) was added cautiously to a mixture of 250 g (0.48 mole) of the bischloroformate and 29.6 g (0.16 mole) of adipyl chloride (freshly redistilled) dissolved in 2.2 liters of methylene chloride (15° C.) in a "Waring" blender. A rapid exothermic reaction occurred. One minute after the piperazine addition was begun 750 ml of 10% aqueous sodium carbonate solution was added all at once. Mixing was continued for 15 minutes; ice was added as required to control the boiling. "Agerite White" antioxidant (N,N'-di-2-naphthyl-p-phenylene diamine) (2.5 g) was added and stirred into the viscous emulsion. The emulsion was treated with 6 liters of boiling water. The resulting sticky crumb was returned to the blender with one liter of boiling water and stirred for 10 minutes under conditions of maximum shear. The heat and mixing drove off the remaining solvent yielding a finely granulated crumb.

The fine crumb was filtered and washed with distilled water until the pH of the wash equalled that of the distilled water. The fine crumb was dried for 18 hours at 80° C. in a vacuum oven using a nitrogen bleed.

The resulting thermoplastic polyether polyurethane, hereinafter polyurethane B, was found to have a Shore A hardness (ASTM D-2240) of 82, a melting temperature of 210° C., a glass transition temperature as measured by differential scanning calorimetry of −68° C., and a density of 1.11 gm/cm$^3$. The polyurethane had an inherent viscosity of 2 to 2.7 in meta cresol (0.1% conc., 30° C.). The Clash Berg $T_{10,000}$ (ASTM D-1043) was −59° C.

The Izod for a blend of 30% of this polyurethane in polyoxymethylene homopolymer was 897 J/m.

EXAMPLES 3-8

Effect of Thermoplastic Polyurethane Proportion

A thermoplastic polyurethane described in greater detail in Table I below, and referred to therein and hereinafter as polyurethane C, was blended in various proportions into polyoxymethylene homopolymer, and the blends were injection molded into standard test bars which were tested for flexural modulus and Izod with the following results:

TABLE I

| Example | Polyurethane (weight percent) | Flex. Mod. (MPa) | Izod (J/m) |
|---|---|---|---|
| Control | 0 | 2620 | 123 |
| 3 | 5 | 2480 | 198 |
| 4 | 20 | 1360 | 443 |
| 5 | 25 | 1390 | 732 |
| 6 | 30 | 1230 | 1380 |
| 7 | 35 | 1010 | 1175+[(a)] |
| 8 | 40 | 920 | [(b)] |

[(a)]values averaging 1175 J/m on some of the six samples tested and no break on others
[(b)]no break on all samples It can be seen that compositions characterized by extraordinary toughness can be prepared from compositions containing something less than 20 weight percent of polyurethane, and that generally, the more polyurethane, the higher the toughness rating.

EXAMPLES 9-48

Comparisons of Various Thermoplastic Polyurethanes

A variety of commercially available thermoplastic polyurethanes were blended in various proportions (20, 30 or 40 weight percent) with polyoxymethylene homopolymer injection molded into standard test bars, and tested for flexural modulus and Izod. Table II, below, lists the various polyurethane used, and the chemical composition, inherent viscosity and glass transition temperature of each. In Table II, ADIP=adipic acid, BDO=1,4-butanediol, MDI=4,4'-methylene bisphenyl isocyanate, EG=ethylene glycol, PCL=poly ε-caprolactone, HPDPM=4,4'-dihydroxylpropyl diphenyl ether, HDO=1,6-hexane diol, PICM=4,4'-methylene bis(cyclohexyl isocyanate), PTMEG=-poly(tetramethylene ether) glycol, PPG=polypropylene glycol, HEHQ=bis-(β-hydroxyethyl)hydroquinone, I-P=isophthalic acid, DEG=diethylene glycol, and TDI=2,4-tolylene diisocyanate.

TABLE II

| Example No. | Polyurethane | Composition (wt. %) | Inherent Viscosity | Soft Segment Tg (°C.) |
|---|---|---|---|---|
| 9 | C | 37 ADIP, 39 BDO, 24 MDI | 1.33 | −35 |
| 10 | D | 37 ADIP, 39 BDO, 24 MDI | 1.04 | −35 |
| 11 | E | 37 ADIP, 39 BDO, 24 MDI | 1.13 | −35 |
| 12 | F | 46 ADIP, 30 EG, 24 MDI | 0.78 | −20 |
| 13 | G | 16 ADIP, 6 BDO, 16 DEG, 34 PCL, 27 MDI | — | −28 |
| 14 | H | 45 ADIP, 4 BDO, 26 EG, 26 MDI | 1.00 | −18 |
| 15 | I | 35 ADIP, 35 BDO, 30 MDI | 1.19 | −33 |

TABLE II-continued

| Example No. | Polyurethane | Composition (wt. %) | Inherent Viscosity | Soft Segment Tg (°C.) |
|---|---|---|---|---|
| 16 | J | 44 ADIP, 35 BDO, 17 MDI 4-HDPDM, | 1.41 | −15 |
| 17 | K | 7 BDO, 33 MDI, 60 PTMEG | 1.29 | −28 |
| 18 | L | HDO, HYW | 0.74 | −21 |
| 19 | M | 36 BDO, 41 ADIP, 23 MDI | 1.25 | −22 |
| 20 | N | 37 BDO, 34 ADIP, 27 MDI | 0.81 | −33 |
| 21 | O | 43 BDO, 46 ADIP, 12 MDI | 0.92 | −30 |
| 22 | P | 36 BDO, 34 ADIP, 30 MDI | 1.18 | −24 |
| 23 | Q | 42 ADIP, 43 BDO, 15 MDI | 0.69 | 9 |
| 24 | R | 42 BDO, 45 ADIP, 13 MDI | 0.91 | −26 |
| 25 | S | 56 PTMEG, 9 BDO, 35 MDI | 1.50 | −61 |
| 26 | T | 42 BDO, 36 ADIP, 22 MDI | 0.72 | −33 |
| 27 | U | 3 BDO, 27 MDI, 67 PTMEG, 3 HEHQ | 0.71 | −34 |
| 28 | V | 38 BDO, 34 ADIP, 28 MDI | 1.38 | −28 |
| 29 | W | 56 PCL, 11 BDO, 33 MDI | 0.73 | −48 |
| 30 | X | 30 PCL, 42 PPG, 23 MDI | — | −37 |
| 31 | Y | 59 PTMEG, 10 BDO, 31 MDI | 0.58 | −61 |
| 32 | Z | 35 ADIP, 37 BDO, 28 MDI | 0.64 | −34 |
| 33 | AA | 32 ADIP, 25 BDO, 26 MDI, 17 HEHQ | 0.56 | −20 |
| 34 | BB | 26 ADIP, 36 BDO, 38 MDI | 0.89 | −12 |
| 35 | CC | 34 ADIP, 37 BDO, 29 MDI | 0.67 | −13 |
| 36 | DD | 56 PTMEG, 8 BDO, 37 MDI | 1.65 | −26 |
| 37 | EE | 33 ADIP, 35 BDO, 3 EG, 28 MDI | 0.73 | −10 |
| 38 | FF | 38 BDO, 32 ADIP, 30 MDI | 0.84 | −16 |
| 39 | GG | PTMEG, PPG-ALLYL ETHER, TDI | 1.67 | — |
| 40 | HH | 27 BDO, 21 ADIP, 42 PICM, 10 I-P | 0.69 | −18 |
| 41 | II | 71 PTMEG, 29 PICM | 1.26 | −39 |
| 42 | JJ | 44 PTMEG, 11 BDO, 45 MDI | 1.59 | 4 |
| 43 | KK | 6 BDO, 31 MDI, 64 PTMEG | 0.75 | −35 |
| 44 | LL | 6 PPG, 41 PTMEG, 9 BDO, 6 PEG, 38 MDI | 0.75 | −20 |
| 45 | MM | 71 PTMEG, 29 PICM | 0.77 | −36 |
| 46 | NN | PTMEG, PICM | 0.33 | −38 |
| 47 | OO | 21 HDO, 37 PICM, 27 ADIP, 15 DEG | 1.20 | 10 |
| 48 | PP | 28 PTMEG, 17 BDO, 55 MDI | 0.71 | 18 |

Table III, below, lists Izod values for compositions containing 30 weight percent of each of these polyurethanes, and for those few additional compositions containing 20 and 40 percent polyurethane in all cases where such tests were run and the resulting test data is available. In addition, flexural modulus is reported for compositions containing 30 weight percent of the polyurethane.

TABLE III

| Example No. | Polyurethane | Izod (J/m) 20% | 30% | 40% | Flex. Mod. (MPa) |
|---|---|---|---|---|---|
| 9 | C | | 1148 | | 1240 |
| 10 | D | 443 | 1282 | (a) | 1310 |
| 11 | E | | 1025 | | 1210 |
| 12 | F | 166 | 774 | | 1000 |
| 13 | G | | 694 | | 1120 |
| 14 | H | | 513 | 689 | 1230 |
| 15 | I | | 678 | 1004+(b) | 1230 |
| 16 | J | | 641 | | 1290 |
| 17 | K | | 534 | | — |
| 18 | L | | 510 | | 1140 |
| 19(c) | M | | 800 | | 1250 |
| 20 | N | 315 | 459 | 1036 | 1500 |
| 21 | O | | 438 | | 1180 |
| 22(c) | P | | 1220 | | 1240 |
| 23 | Q | | 384 | 716+(b) | 1250 |
| 24 | R | | 384 | | 1230 |
| 25 | S | 139 | 375 | | 1340 |
| 26 | T | 267 | 374 | 614 | 1140 |
| 27 | U | | 368 | | 1190 |
| 28(c) | V | | 960 | | 1290 |
| 29 | W | | 326 | 502 | 1200 |
| 30 | X | | 352 | 235 | 1050 |
| 31 | Y | | 182 | 374+(b) | 1230 |
| 32 | Z | | 326 | | 1190 |
| 33 | AA | | 208 | | 1310 |
| 34 | BB | | 304 | | 1320 |
| 35 | CC | 144 | 294 | 1271 | 1210 |
| 36 | DD | | 294 | | 1460 |
| 37 | EE | | 283 | | 1300 |
| 38 | FF | | 267 | | 1280 |
| 39 | GG | | 224 | | 960 |
| 40 | HH | 144 | 224 | | 1100 |
| 41 | II | | 177 | | 1410 |
| 42 | JJ | | 150 | | 1500 |
| 43 | KK | | 128 | | 1230 |
| 44 | LL | | 123 | | 1340 |
| 45 | MM | 117 | 91 | (d) | 1050 |
| 46 | NN | | 89 | | 1410 |
| 47 | OO | 80 | 64 | (d) | 1030 |
| 48 | PP | | 64 | | 1830 |

(a)no break
(b)no break on some samples
(c)60° C. mold temperature
(d)delaminated too badly to run a notched Izod test Several conclusions can be drawn from these data. First, the greater the proportion of polyurethane, the higher the toughness of the composition. Second, polyurethanes having a glass transition temperature of about −15° C. or higher generally give compositions not characterized by extraordinary toughness. Third, polyurethanes having an inherent viscosity lower than about 0.7 generally give compositions not characterized by extraordinary toughness, at least at 30% loading. Finally, a variety of thermoplastic polyurethanes do give compositions characterized by extraordinary toughness, provided that glass transition temperature and inherent viscosity guidelines are observed.

EXAMPLES 49-54

Effect of Average Cross-Sectional of the Polyurethane Phase

Compositions containing 30 weight percent of polyurethane D and 70 weight percent polyoxymethylene homopolymer were prepared. These compositions contained the same ingredients in the same proportions, but molding conditions were intentionally varied from sample to sample to create a variance in average cross-sectional size of the polyurethane phase. The results are reported in Table IV, below.

TABLE IV

| Example No. | Average Cross-Sectional Size (μ) | Izod (J/m) |
|---|---|---|
| 49 | 0.27 | 1070+(a) |
| 50 | 0.36 | 1070+(a) |
| 51 | 0.37 | 1070+(a) |
| 52 | 0.45 | 1070+(a) |
| 53 | 0.56 | 326 |
| 54 | 0.68 | 395 |

(a)no break on some samples

In any event, these data show that smaller polyurethane phase average cross-sectional size gives higher toughness. When a value of 1070 J/m is exceeded, the incidence of specimens where no crack is propagated increases so at a level of 1600 J/m, very few of a set of 6 specimens will be even slightly torn. This limitation of high values is a function of the testing physics and somewhat also dependent upon modulus and tensile strength of the specimen. For the blends tested in Examples 49–52 the reported values have been arbitrarily limited to 1070 J/m even though several blends reached levels of about 1350 J/m, because several specimens in those groups usually exhibited "No Break" behavior.

EXAMPLES 55–56

Effect of Proportion of Polyurethane in Composition

Compositions containing 35% and 20%, respectively, of polyurethane D in polyoxymethylene homopolymer were prepared. Conditions for preparation of the compositions and molding of the samples were the same in both cases, but the proportion of polyurethane was varied to demonstrate that when the proportion of polyurethane is small (20%), even very small average cross-sectional size of the polyurethane phase (0.38μ) gives only a moderate Izod value. Similarly, when the proportion of polyurethane is large (35%), even relatively large average cross-sectional size of the polyurethane phase (0.59μ) gives an excellent Izod value. Data is shown in Table V.

TABLE V

| Example No. | Polyurethane Proportion | Average Cross-Sectional Size (μ) | Izod (J/m) |
|---|---|---|---|
| 55 | 35 | 0.59 | 1070[a] |
| 56 | 20 | 0.38 | 445 |

[a]no break on some samples

EXAMPLES 57–69

Effect of Inherent Viscosity

In an effort to isolate as much as possible the influence of inherent viscosity of the polyurethane on toughness from the influence of other parameters, a number of thermoplastic polyurethane similar to that described in Example 1 were prepared differing from each other primarily in their inherent viscosity. Minor variations in the ratios of the reactive components were made to prepare a variety of samples with varying molecular weights. Furthermore, variations in the purity of components used in the preparation of high molecular weight components gives rise to variations in the molecular weights. Table VI shows how molecular weight of the polyurethane (as measured by inherent viscosity) affects the Izod value of a 30% blend of the polyurethane in polyoxymethylene homopolymer. A strong correlation is found. From these data, it can be seen that the preferred I.V. of this type of thermoplastic polyurethane is greater than 0.8, more preferred is greater than 0.9, and most preferred is greater than 1.0.

TABLE VI

| Example No. | Inherent Viscosity | Izod (J/m) |
|---|---|---|
| 57 | 0.38 | 64 |
| 58 | 0.51 | 69 |
| 59 | 0.66 | 170 |
| 60 | 0.69 | 240 |
| 61 | 0.79 | 400 |
| 62 | 0.81 | 336 |
| 63 | 0.86 | 422 |
| 64 | 1.00 | 774 |
| 65 | 1.01 | 593 |
| 66 | 1.05 | 497 |
| 67 | 1.15 | 897 |
| 68 | 1.29 | 880 |
| 69 | 1.47 | 1080 |

EXAMPLES 70–81

Effect of Inherent Viscosity

A further demonstration of the relationship between inherent viscosity and Izod values, although not as controlled as the previous set of Examples, can be found in the Examples immediately following. Each of these experiments was run in the same manner as described above (30 weight percent polyurethane in polyoxymethylene homopolymer) and each of the polyurethanes contained butane diol adipate soft segments with glass transition temperatures below −20° C., and butane diol-MDI hard segments. The results of these tests are shown in Tables VII and VIII below.

TABLE VII

| Example | Polyurethane | I.V. | Izod (J/m) | Flex. Mod. (MPa) |
|---|---|---|---|---|
| 70 | Z | 0.64 | 326 | 1190 |
| 71 | T | 0.72 | 374 | 1140 |
| 72 | N | 0.81 | 459 | 1500 |
| 73 | E | 1.13 | 1025 | 1210 |
| 74 | I | 1.19 | 694 | 1240 |

Although the following group of experiments were not run "side-by-side", and accordingly may not represent precise and accurate comparisons, the influence of inherent viscosity, all other parameters being approximately equal, can be seen. All of the polyurethanes are of the ADIP/BDO/MDI type although the proportions of these segments does vary somewhat, and all have a glass transition temperature in the range of −33° to −35° C.

TABLE VIII

| Example | Polyurethane | I.V. | Izod (J/m) | Flex. Mod. (MPa) |
|---|---|---|---|---|
| 75 | Z | 0.64 | 326 | 1190 |
| 76 | T | 0.72 | 374 | 1130 |
| 77 | N | 0.81 | 459 | 1500 |
| 78 | D | 1.04 | 1282 | 1310 |
| 79 | E | 1.13 | 1025 | 1210 |
| 80 | I | 1.19 | 678 | 1230 |
| 81 | C | 1.33 | 1148 | 1240 |

EXAMPLES 82–99

Interrelationship Between Tg, Average Cross-Sectional Size, I.V. and Izod

Compositions were prepared with 30 weight percent of each of various thermoplastic polyurethanes and 70 weight percent of polyoxymethylene homopolymer. Samples were prepared and tested as described above, and the results are reported in Table IX, below, listed in decreasing order of the glass transition temperature of the polyurethane.

TABLE IX

| Example Number | Polyurethane | Soft Segment Tg (°C.) | Average Cross-Sectional Size (μ) | I.V. | Izod (J/m) |
|---|---|---|---|---|---|
| 82 | PP | 18 | 0.40 | 0.71 | 64 |
| 83 | Q | 9 | 0.31 | — | 384 |
| 84 | JJ | 4 | 0.38 | 1.59 | 150 |

TABLE IX-continued

| Example Number | Polyurethane | Soft Segment Tg (°C.) | Average Cross-Sectional Size (μ) | I.V. | Izod (J/m) |
|---|---|---|---|---|---|
| 85 | BB | −12 | 0.57 | 0.89 | 304 |
| 86 | CC | −13 | 0.51 | 0.67 | 294 |
| 87 | J | −15 | 0.42 | 1.41 | 641 |
| 88 | H | −18 | 0.36 | 1.00 | 513 |
| 89 | F | −20 | 0.37 | 0.78 | 774 |
| 90 | AA | −20 | 0.61 | 0.56 | 208 |
| 91 | L | −21 | 0.53 | 0.74 | 510 |
| 92 | G | −28 | 0.47 | 1.04 | 694 |
| 93 | I | −33 | 0.64 | 1.19 | 513 |
| 94 | N | −33 | 0.54 | 0.81 | 459 |
| 95 | Z | −34 | 0.53 | 0.64 | 326 |
| 96 | D | −35 | 0.44 | 1.04 | 1282 |
| 97 | X | −37 | 0.69 | — | 352 |
| 98 | W | −48 | 0.50 | 0.73 | 326 |
| 99 | B | −55 | 0.36 | — | 897 |

While it is impossible to isolate the parameters measured in these tests from each other and from the other parameters discussed above, it is shown that, generally, those compositions in which the polyurethane phase has a small average cross-sectional size, has the lowest glass transition temperature, and has an inherent viscosity greater than 0.7 show the greatest toughness.

EXAPLES 100–106

Polyoxymethylene Copolymer Compositions

Polyoxymethylene copolymers were also used to prepare compositions characterized by extraordinary toughness. In each of the following examples, 30 weight percent of polyurethane B or D (described in Table II, above) was melt compounded as described above with 70 weight percent of each of the listed polyoxymethylene copolymers. Standard test samples were then prepared by injection molding, as described above, and Izod values were obtained. The results are reported in Table X below. Each of the polyoxymethylene copolymers in Examples 100–105 is a polyoxymethylene dipolymer containing approximately 2 weight percent ethylene oxide. The copolymer of Example 106 is believed to be a terpolymer containing about 2 weight percent ethylene oxide and about 500 parts per million diglycidyl ether of 1,4-butanediol.

TABLE X

| Example No. | Polyurethane | Copolymer | Izod (J/m) |
|---|---|---|---|
| 100 | D | "Celcon" M25-04 | 1282 |
| 101 | D | "Polyplastics" M25-01 | 967 |
| 102 | D | "Ultraform" 2320X | 1271 |
| 103 | D | "Ultraform" H2200 | 1159 |
| 104 | D | "Ultraform" H2320X | 1143 |
| 105 | D | "Hostaform" C2521 | 940 |
| 106 | B | "Celcon" U10-01 | 1137 |

EXAMPLES 107–110

Use of Blends of Thermoplastic Polyurethanes

In some instances, it may be desirable to prepare compositions of the present invention by melt compounding polyoxymethylene with more than one thermoplastic polyurethane. Further, in some instances, such as that shown below, the combination of polyurethanes can be more effective than an equal quantity of either polyurethane used alone.

Two thermoplastic polyurethane melt blends, 50/50 and 25/75 (polyurethane F/polyurethane S) were prepared by passing them through the twin screw extruder then pelletizing and drying. They and the individual thermoplastic polyurethane controls were then compounded at the 30 weight percent level in polyoxymethylene homopolymer. The blends were then molded and characterized. Table XI illustrates how the combination of the two polyurethanes gave a higher toughness than either component by itself.

TABLE XI

| Example No. | Proportion By Weight of Polyurethane: Polyurethane F | S | Izod (J/m) |
|---|---|---|---|
| 107 | 0 | 100 | 374 |
| 108 | 25 | 75 | 956 |
| 109 | 50 | 50 | 999 |
| 110 | 100 | 0 | 774 |

EXAMPLE 111

Composition Containing All Soft Segment Polyurethane

Polyurethanes having no hard segments can also be used in preparing the compositions of the present invention. A polyurethane was prepared as described in Example 1 except that the starting materials comprised equimolar amounts of polybutylene adipate (MW$\approx$1950) and MDI, but no butane diol chain extender. The inherent viscosity was 1.87 and when blended into polyoxymethylene homopolymer at the 30% level gave a notched Izod value of 830 J/m four days after molding.

EXAMPLES 112–114

Compositions Containing Polyurethane with Low Level of Hard Segments

Similarly, polyurethanes containing a very small proportion of hard segments can be used in preparing the compositions of the present invention. Polyurethanes were prepared as described in Example 1 except that the starting materials were used in the relative molar amounts shown in Table XII below. Inherent viscosity of the polyurethane and Izod value of compositions containing 30% of such polyurethanes in polyoxymethylene homopolymer are also shown in Table XII.

TABLE XII

| Example | Polybutylene Adipate | MDI | Butane Diol | Inherent Viscosity | Izod (J/m) |
|---|---|---|---|---|---|
| 112 | 1.0 | 1.17 | 0.17 | 1.90 | 714 |
| 113 | 1.0 | 1.25 | 0.25 | 2.19 | 819 |
| 114 | 1.0 | 1.34 | 0.34 | 1.96 | 729 |

EXAMPLE 115

Composition Containing Polyurethane with Broad Molecular Weight Distribution of Soft Segment Polyurethanes having soft segments of varying lengths can be used in preparing compositions of the present invention. A polyurethane was prepared as described in Example 1 except that the starting materials included a mixture of polybutylene adipates (one being molecular weight 1030 and comprising 20.8% of the mixture and the other being molecular weight 2250 and comprising 79.2% of the mixture). The average molecular weight of the polybutylene adipate mixture was approximately 1950. A blend of 30% of this polyurethane (inherent viscosity≈1.50) in polyoxymethylene homopolymer gave an Izod value of 940 J/m.

EXAMPLE 116

Composition Containing Polyurethane with Broad Molecular Weight Distribution

Similarly, the compositions of the present invention can be prepared from polyurethanes of varying molecular weights. Two polyurethanes were prepared as described in Example 115, one having an inherent viscosity of 1.79 and the other having inherent viscosity of 0.83. A blend of 70% of the first and 30% of the second polyurethane was prepared and a composition containing 30% of this blend in polyoxymethylene homopolymer gave an Izod value of 824 J/m.

EXAMPLE 117

Composition Containing Branched Polyurethane

A branded polyurethane was prepared as described in Example 1 by replacing 0.9% of the butane diol starting material with 0.6% trimethylol propane. This polyurethane had an inherent viscosity of 1.89 and a composition containing 30% of this polyurethane in polyoxymethylene homopolymer gave an Izod value of 888 J/m. This composition was compounded as was the composition of Example 1, but was molded in a 6 ounce Van Dorn molding machine with barrel and nozzle settings of 185° C., a mold temperature of 60° C., a 3/45/15 boost/inject/hold cycle, a screw speed of 60 r.p.m., a "fast" setting for ram speed, and a 50 p.s.i. back pressure.

EXAMPLE 118

Composition Containing Polyurethane with PICM

A polyurethane was prepared as described in Example 1, except that the starting materials included an equimolar amount of 4,4'-dicyclohexylmethane diisocyanate (PICM) instead of the 4,4'-methylene bis(-phenylisocyanate) (MDI). The inherent viscosity of the polyurethane was 1.44 and a composition containing 30% of this polyurethane in polyoxymethylene homopolymer gave an Izod value of 720 J/m.

EXAMPLE 119

Compositions of Lower Molecular Weight Polyoxymethylenes

A blend of 40 weight percent polyurethane F in acetate end-capped polyoxymethylene homopolymer having a number average molecular weight of about 38,000 was extruded as described above. The blend was injection molded in the manner described above except for the use of a 40° C. mold temperature. The Izod was 513 J/m.

EXAMPLE 120

Composition Containing Polyoxymethylene Homopolymer and Branched Terpolymer

A composition was prepared containing 30% polyurethane D, 7% "Celcon" U-10 (branched terpolymer believed to contain about 2 weight percent ethylene oxide, about 500 parts per million diglycidyl ether of 1,4-butanediol and a complemental amount of methylene oxide), and 63% of polyoxymethylene homopolymer. This composition had an Izod value of 1110 J/m.

EXAMPLES 121-124

Effect of Molding Conditions

As mentioned above, molding conditions can influence the properties of the shaped article. For example, a colder mold temperature generally gives smaller polyurethane particle size, and accordingly a higher Izod rating. Similarly, higher barrel temperatures generally give shaped articles with higher Izod ratings, at least up to the point where there is degradation of the polyurethane. Table XIII summarizes data obtained when a previously melt compounded blend of 30 weight percent polyurethane D in 70 weight percent of polyoxymethylene homopolymer was molded into test specimens using an injection molding machine as described earlier, except for the parameters specified in Table XIII. Izod ratings were taken only 24 hours after molding, rather than the customary 3 days.

TABLE XIII

| Example | Barrel Section Temperature Set (°C.) | | | | Mold | Izod |
|---|---|---|---|---|---|---|
| No. | Rear | Middle | Front | Nozzle | Temp. (°C.) | (J/m) |
| 121 | 170 | 180 | 180 | 190 | 50 | 945 |
| 122 | 170 | 180 | 180 | 190 | 90 | 395 |
| 123 | 180 | 190 | 200 | 210 | 50 | 1319 |
| 124 | 180 | 190 | 200 | 210 | 90 | 1084 |

EXAMPLE 125

Simultaneous Melt Compounding and Molding

While it is preferred to prepare the shaped articles of the present invention from compositions of the present invention that have been previously melt compounded, melt compounding and molding can be done simultaneously. A pellet blend of 30 weight percent polyurethane D and 70 weight percent pelletized polyoxymethylene homopolymer containing the stabilizer and antioxidant described immediately above Example 1 was tumbled in a plastic bag, then molded in a 1½ oz. Arburg injection molding machine using a 1.4 MPa back pressure, a 60° C. mold temperature, and a 5 second boost. The resulting specimens had a notched Izod value of 1175 J/m.

EXAMPLE 126

High Compounding Temperatures

Melt temperatures considerably above those normally used for thermoplastic polyurethanes and for polyoxymethylene can be used if care is taken to minimize the total amount of time at these elevated temperatures. A screw was designed for the 28 mm. twin-screw extruder to allow the blend to be fed in the rear vacuum port and transported to the kneading blocks with minimum mechanical energy to avoid melting the polymers. Very shortly after compounding, the melt exited the die and was water quenched. The screw design was: tips, 030/010, 030/030, 24/016 LH, KB 045, then 045/090 feed sections back past the rear vacuum port. The barrel sections were heated or cooled; rear section —$H_2O$, rear-center —$H_2O$, center 150° C., front-center 190° C., front 190° C., and die 190° C. The extruder was run at 157 r.p.m. and a feed rate of 8.2 kg/hr. The composition was 30% polyurethane C in polyoxymethylene homopolymer. Although the temperature of the melt reached 270° C., the extruded strand of composition was white and bars molded with a 60° C. mold temperature had an Izod of 1120 J/m.

Industrial Applicability

The polyoxymethylene compositions of the present invention are useful in the manufacture of finished articles such as sports helmets, safety helmets, shoe cleats, safety stearing column components, specialty zippers and railroad tie insulators. The extraordinary toughness of articles made from these compositions combined with other outstanding properties normally found in polyoxymethylene compositions make them particularly well suited for applications where engineering plastics have heretofore been unsuitable, such as fuel tanks.

Best Mode

Although the best mode of the present invention, i.e. the single best polyoxymethylene composition of the present invention, will depend upon the particular desired end use and the specific requisite combination of properties for that use, the single composition and molding conditions of the present invention that result in a product most preferred for its overall balance of properties is described in detail in EXamples 6 and 123. While it is not a part of the present invention, it is preferred to incorporate in the compositions of the present ivnention about 0.8 weight percent ethylene bis-stearamide and about 0.1 weight percent of a polycarbodiimide (or a mixture of polycarbodiimides) having a molecular weight of about 1000 and containing units of the formula

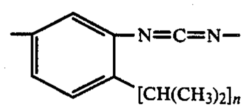

where n has an average value of about 3.

I claim:

1. A toughened thermoplastic polyoxymethylene composition consisting essentially of (a) greater than 15 weight percent and not more than 40 weight percent of at least one thermoplastic polyurethane, which polyurethane has a soft segment glass transition temperature of lower than −15° C., and (b) at least 60 weight percent and less than 85 weight percent of at least one polyoxymethylene polymer, which polyoxymethylene polymer has a number average molecular weight of from 20,000 to 100,000, the above-stated percentages being based on the total amount of components (a) and (b) only, the thermoplastic polyurethane being dispersed throughout the polyoxymethylene polymer as a separate phase having an average cross-sectional size in the minimum direction of 0.01–0.9 microns, and the composition having an Izod value of greater than 375 J/m.

2. The composition of claim 1 wherein the polyoxymethylene is a homopolymer.

3. The composition of claim 1 wherein the polyoxymethylene is a copolymer.

4. The composition of claim 3 wherein the polyoxymethylene contains at least one comonomer which is an oxyalkylene group with at least two adjacent carbon atoms in the main valence chain.

5. The composition of claim 4 wherein the comonomer is selected from the group consisting of alkylene oxides of 2–12 carbon atoms.

6. The composition of claim 5 wherein the copolymer is a dipolymer and the comonomer is ethylene oxide.

7. The composition of claim 5 wherein the copolymer is a terpolymer and the comonomers are ethylene oxide and diglycidyl ether of 1,4-butane diol.

8. The composition of claim 4 wherein the weight percent of comonomer in the polyoxymethylene copolymer is from 0.1 to 20.0.

9. The composition of claim 8 wherein the comonomers comprise not more than 15.0 weight percent of the copolymer.

10. The composition of claim 9 wherein the comonomers comprise about 2 weight percent of the copolymer.

11. The composition of claim 1 which has a notched Izod value of greater than 500 J/m.

12. The composition of claim 1 which has a notched Izod value of greater than 650 J/m.

13. The composition of claim 1 wherein the polyoxymethylene polymer has a number average molecular weight of 25,000 to 90,000.

14. The composition of claim 1 wherein the polyoxymethylene polymer has a number average molecular weight of 30,000 to 70,000.

15. The composition of claim 1 wherein the polyoxymethylene polymer has a melt flow rate of 0.1–30.0 grams/10 minutes.

16. The composition of claim 1 wherein the polyoxymethylene polymer has a melt flow rate of 0.5–10.0 grams/10 minutes.

17. The composition of claim 1 wherein the thermoplastic polyurethane comprises 20 to 40 weight percent of the composition.

18. The composition of claim 1 wherein the thermoplastic polyurethane comprises 20 to 35 weight percent of the composition.

19. The composition of claim 1 wherein the thermoplastic polyurethane comprises 25 to 35 weight percent of the composition.

20. The composition of claim 1 wherein the thermoplastic polyurethane comprises 25 to 32 weight percent of the composition.

21. The composition of claim 1 wherein the average cross-sectional size of the thermoplastic polyurethane phase is not greater than 0.7 microns.

22. The composition of claim 1 wherein the average cross-sectional size of the thermoplastic polyurethane phase is not greater than 0.5 microns.

23. The composition of claim 1 wherein the thermoplastic polyurethane comprises soft segments having a number average molecular weight of at least 500.

24. The composition of claim 1 wherein the thermoplastic polyurethane comprises soft segments having a number average molecular weight of from 550 to 5000.

25. The composition of claim 1 wherein the thermoplastic polyurethane comprises soft segments having a number average molecular weight of from 1000 to 2500.

26. The composition of claim 1 wherein the thermoplastic polyurethane contains a diol chain extender having a number average molecular weight of less than about 250.

27. The composition of claim 1 wherein the thermoplastic polyurethane has a ratio of isocyanate to hydroxyl of 0.95 to 1.08.

28. The composition of claim 1 wherein the thermoplastic polyurethane has a ratio of isocyanate to hydroxyl of 0.95 to 1.05.

29. The composition of claim 1 wherein the thermoplastic polyurethane has a ratio of isocyanate to hydroxyl of 0.95 to less than 1.00.

30. The composition of claim 1 wherein the thermoplastic polyurethane is derived from the reaction of a hydroxy terminated polyester, a diol chain extender and a diisocyanate.

31. The composition of claim 30 wherein the polyester is selected from the group consisting of polycaprolactone, poly(butylene adipate), poly(ethylene adipate) and mixtures thereof.

32. The composition of claim 1 wherein the thermoplastic polyurethane is derived from the reaction of a hydroxy terminated polyether, a diol chain extender and a diisocyanate.

33. The composition of claim 32 wherein the polyether is selected from the group consisting of polytetramethylene ether glycol, poly(propylene oxide), poly(ethylene oxide), copolymers of propylene oxide and ethylene oxide, and mixtures thereof.

34. The composition of claim 30 wherein the thermoplastic polyurethane is derived from the reaction of 1,4-butylene adipate, 4,4'-methylene bis(phenylisocyanate) and 1,4-butanediol.

35. The composition of claim 34 wherein the thermoplastic polyurethane has an inherent viscosity of greater than 0.8.

36. The composition of claim 34 wherein the thermoplastic polyurethane has an inherent viscosity of greater than 0.9.

37. The composition of claim 34 wherein the thermoplastic polyurethane has an inherent viscosity of greater than 1.0.

38. The composition of claim 31 wherein the diisocyanate is selected from the group consisting of 4,4'-methylene bis(phenylisocyanate), 1,6-hexamethylene diisocyanate, 4,4'-methylene bis (cyclohexyl isocyanate) and 2,4-tolylene diisocyanate.

39. The composition of claim 33 wherein the diisocyanate is selected from the group consisting of 4,4'-methylene bis(phenylisocyanate), 1,6-hexamethylene diisocyanate, 4,4'-methylene bis(cyclohexylisocyanate) and 2,4-tolylene diisocyanate.

40. The composition of claim 38 wherein the diisocyanate is 4,4'-methylene bis(phenylisocyanate).

41. The composition of claim 38 wherein the diisocyanate is 4,4'-methylene bis (cyclohexyl isocyanate).

42. The composition of claim 39 wherein the diisocyanate is 4,4'-methylene bis(phenylisocyanate).

43. The composition of claim 39 wherein the diisocyanate is 4,4'-methylene bis(cyclohexylisocyanate).

44. The composition of claim 26 wherein the glycol is selected from the group consisting of 1,4-butanediol, ethylene glycol and 1,6-hexanediol.

45. The composition of claim 38 wherein the glycol is 1,4-butanediol.

46. The composition of claim 1 wherein the thermoplastic polyurethane has a soft segment glass transition temperature of lower than −20° C.

47. The composition of claim 1 wherein the thermoplastic polyurethane has a soft segment glass transition temperature of lower than −30° C.

48. The composition of claim 1 wherein the thermoplastic polyurethane has a soft segment glass transition temperature of about −35° C.

49. The composition of claim 1 which is suited for use in the preparation of shaped articles.

50. Shaped articles made from the composition of claim 1.

51. A shaped article of claim 49 selected from the group consisting of sheet, profiles, rod stock, film, filaments, fibers, strapping, tape, tubing and pipe.

* * * * *